United States Patent Office 3,471,268
Patented Oct. 7, 1969

---

3,471,268
PREPARATION OF ALKALI METAL BOROHYDRIDES
Jean Claude Bontempelli, Champigny, and Pierre Garet, Thiais, France, assignors to Rhone-Poulenc S.A., Paris, France, a French body corporate
No Drawing. Filed Feb. 28, 1966, Ser. No. 530,367
Claims priority, application France, Mar. 4, 1965, 7,974
Int. Cl. C01b 6/14
U.S. Cl. 23—361         8 Claims This invention relates to the preparation of alkali metal borohydrides.

The methods of preparation of sodium borohydride given by Schlesinger et al. [J. Amer. Chem. Soc. 75, 205–209 (1953)] are based on two types of reaction:

(a) $4NaH + B(OC_2H_5)_3 \rightarrow NaBH_4 + 3NaOC_2H_5$
(b) $4NaH + 2B_2O_3 \rightarrow NaBH_4 + 3NaBO_2$ Methods based on the use of these reactions have the disadvantage of depending on the use of upgraded boron derivatives, which, in the case of the borate esters are relatively dear. Moreover an acceptable yield (64% of theory) is only obtained using boric anhydride if the reaction mixture is simultaneously ground.

Attempts have therefore been made to use starting materials which are more common and/or less costly than boric anhydride and boric esters. For example, French patent specification No. 1,212,817 discloses that minerals such as borax, tincal and kernite may be used in the preparation of alkali metal borohydrides by reaction with silica and the corresponding metal hydride. Thus, sodium borohydride is prepared, in accordance with this proposal, by heating a mixture of borax, sodium and quartz in the presence of hydrogen, sodium hydride being initially formed, which then reacts with the mixture of borax and quartz, as follows:

(c) $16Na + 8H_2 + Na_2B_4O_7 + 7SiO_2 \rightarrow 4NaBH_4 + 7Na_2SiO_3$
[or (d) $16NaH + Na_2B_4O_7 + 7SiO_2 \rightarrow 4NaBH_4 + 7Na_2SiO_3$]

It has been found, and it is this which forms the object of the present invention, that borax and sodium hydride react with one another, in the absence of any other compound, to give sodium borohydride of good quality in a yield at least 90% with respect to the sodium hydride of the theoretical, in accordance with the following equation:

$$4NaH + 2Na_2B_4O_7 \rightarrow NaBH_4 + 7NaBO_2$$

The invention accordingly provides a process for the preparation of an alkali metal borohydride which comprises heating together under substantially anhydrous conditions and as the sole reactive compounds an alkali metal hydride and an alkali metal tetraborate.

In practice, when it is desired to produce sodium borohydride, sodium hydride and borax are charged in stoichiometric amounts into an apparatus capable of being thoroughly closed and fitted with a device which permits good stirring of the products and introduction of hydrogen. Then, after the atmosphere in the apparatus has been purged by a stream of hydrogen, the apparatus is closed and progressively heated in an atmosphere of hydrogen at a pressure slightly above atmospheric. Throughout the course of the heating, the mixture of products is intimately mixed. The reaction begins at about 350° C., and, in practice, the reaction mixture is heated to about 400–410° C. There is no advantage in heating to a higher temperature, and at above 450° C. partial decomposition occurs. Once the reaction is complete, the mixture is cooled and the borohydride formed is extracted by conventional methods for its extraction, e.g. with liquid ammonia or isopropylamine. Sodium borohydride of 98% purity is thus obtained, and a loose powder having the composition of sodium metaborate remains. This powder, which is obviously free of other compounds than those of boron and sodium, may be used, for example, in the glass and ceramic industries, or may be converted into borax, reusable in the reaction, by addition of technical boric acid.

Instead of mixing the borax with separately prepared sodium hydride, it is possbile to charge borax and sodium into the apparatus and then form the sodium hydride in situ in a first stage. For this the mixture is heated progressively, with stirring and in an atmosphere of hydrogen, up to about 340° C. Absorption of hydrogen starts at about 110° to 120° C. When no further absorption of hydrogen is observed, the temperature is raised to about 400–410° C. to cause the borax to react with the hydride formed.

In either variant of the method, the pressure of hydrogen may be only a few centimeters of mercury above atmospheric, for example, between 2 and 10 cm. Hg gauge. It is possible to work at a higher pressure of hydrogen.

The particle size of the borax is not critical, but it is nevertheless advantageous to use a product, the particle size of which is between certain limits, the values of which can be easily established by preliminary experiments and are a function of the other working conditions, for example, the volume of the charge, and the type and speed of stirrer. The borax used must be anhydrous.

Although this detailed description relates specifically to the preparation of sodium borohydride from borax, the invention is equally applicable to the preparation of potassium borohydride and lithium borohydride, sodium, sodium hydride, and sodium tetraborate (borax) being respectively replaced by potassium hydride and potassium tetraborate or by lithium, lithium hydride and lithium tetraborate. The appropriate reaction temperature are as follows: 160° to 270° C. for the formation of potassium hydride; 200° to 260° C. for the formation of lithium hydride; 400° to 410° C. for the reaction of potassium hydride with potassium tetraborate; and 200° to 300° C., especially about 260° C., for the reaction of lithium hydride with lithium tetraborate.

The process of the present invention may be carried out discontinuously or continuously.

The following examples illustrate the invention. The borax used leaves a residue of 0 to 15% on AFNOR standard sieve No. 23 and of 40 to 65% on AFNOR sieve No. 18.

Example 1

Anhydrous borax (8.08 g., 0.04 mole) and sodium hydride. (1.92 g., 0.08 mole) are charged into a cylindrical stainless steel apparatus of internal volume 50 cm.³, furnished with a scraper-type stirrer, a baffle plate, a thermometer and a hydrogen inlet. The apparatus is closed, a hydrogen pressure of 2 to 10 cm. Hg is set up, the stirrer is started at 120 revolutions per minute, and the equipment is progressively heated so as to reach 400° C. in about 1 hour, 30 minutes. The temperature of 400° C. is maintained for 15 minutes, and the equipment then cooled.

Extraction is carried out on 180 g. of product, arising from 18 similar operation, using liquid ammonia at 20–25° C. under pressure, employing 58 g. and then 31 g. of ammonia. After evaporation of the ammoniacal solution, 12.6 g. of 99% pure sodium borohydride are obtained, a yield of 92% of theory.

Example 2

Powdered anhydrous borax (8.08 g., 0.04 mole) and metallic sodium wire (1.84 g., 0.08 gram atom) are charged into a cylindrical reactor identical to that of Example 1. The apparatus is closed, a hydrogen pressure of 2 to 10 cm. Hg is then set up, and the mixture is heated (in about 1 hour) to 120° C., using a metal bath, to melt the sodium. The contents of the reactor are then stirred at the rate of 120 revolutions per minute whilst the temperature is progressively raised to 340° C. The absorption of hydrogen starts at 110°–120° C., and continues until the sodium has been completely converted. The volume of hydrogen absorbed rises to 896 cm.$^3$. The progressive increase in temperature is then continued up to 400°–410° C., this temperature being reached in 45 minutes. The temperature is kept 400°–410° C. for 15 minutes and the mixture is then cooled.

Extraction is carried out, as in Example 1, on the product of several operations, and 99% pure sodium borohydride is obtained in a yield of 92% of theory.

Example 3

Anhydrous potassium tetraborate (9.33 g., 0.04 mole) and potassium hydride (3.2 g., 0.08 mole) are charged into the apparatus described in Example 1. The apparatus is closed, a hydrogen pressure of 2 to 10 cm. Hg is set up, and the contents of the reactor are stirred at 120 revolutions per minute. The mixture is progressively heated to 400° C., and this temperature is reached in 2 hours. The mixture is kept at 400° C. for 15 minutes and the mass is then cooled. It contains 4.64% of potassium borohydride, corresponding to a yield of 53.8% based on the potassium hydride.

Example 4

Anhydrous potassium tetraborate (9.33 g., 0.04 mole) and metallic potassium (3.12 g., 0.08 gram atom) are charged into the apparatus described in Example 1. The apparatus is closed, a hydrogen pressure of 2 to 10 cm. Hg is established, and the mixture heated at 105°–110° C. to melt the potassium. The contents of the reactor are then stirred at 120 revolutions per minute whilst the temperature is progressively raised. Absorption of hydrogen starts about 160° C. and continues until the temperature reaches 270° C. The rate of absorption of hydrogen slows down gently, and stops when 90 to 95% of the theoretical amount of hydrogen has been absorbed. The temperature of the mixture is then raised from 270 to 400° C. in the course of 1 hour. The latter temperature is maintained for a quarter of an hour, and the mixture is then cooled. The product obtained contains 7.61% of potassium borohydride corresponding to a yield of 88.4%, based on the potassium.

Example 5

Lithium hydride (0.84 g., 0.106 mole) and anhydrous lithium tetraborate (8.957 g., 0.053 mole) are charged into the apparatus described in Example 1. The apparatus is closed, a hydrogen pressure of 2 to 10 cm. Hg is set up, and the contents of the reactor are stirred at 120 r.p.m. and heated on a metal bath until the mixture reaches 260° C. (which takes a total of 3 hours). The reaction mixture obtained is cooled. It contains 2.56% of lithium borohydride, corresponding to a yield of 43.5%, based on the lithium hydride.

Example 6

Anhydrous lithium tetraborate (10.14 g., 0.06 mole) and metallic lithium wire (0.828 g., 0.12 gram atom) are charged into a cylindrical reactor identical to that of Example 1. The apparatus is closed, a hydrogen pressure of 2 to 10 cm. Hg is set up, and the mixture is heated on a metal bath to 200° C. to melt the lithium. The contents of the reactor are then stirred at 120 r.p.m. whilst the temperature is progressively raised. The absorption of hydrogen starts at 200° C. and continues until the temperature reaches 265° C. The rate of absorption of hydrogen gently decreases and stops when 85 to 90% of the theoretical amount of hydrogen has been absorbed. The temperature of the mixture is kept at about 260° for 3 hours, and the mixture is then cooled. The product obtained contains 4.4 to 4.8% of lithium borohydride, corresponding to an average yield of 78%, based on the lithium.

We claim:

1. Process for the preparation of an alkali metal borohydride which comprises heating together under substantially anhydrous conditions and as the sole reactive compounds, substantially four molecular proportions of an alkali metal hydride and substantially two molecular proportions of an alkali metal tetraborate in accordance with the reaction:

$$4MeH + 2Me_2B_4O_7 \rightarrow MeBH_4 + 7MeBO_2$$

wherein Me is the alkali metal.

2. Process according to claim 1 in which the reaction is carried out in a hydrogen atmosphere.

3. Process according to claim 1 in which sodium hydride is heated with sodium tetraborate at 350° to 450° C.

4. Process according to claim 1 in which lithium hydride is heated with lithium tetraborate at 200° to 300° C.

5. Process according to claim 1 in which potassium hydride is heated with potassium tetraborate at 400° to 410° C.

6. Process according to claim 3 in which sodium hydride is produced in situ by heating metallic sodium at 110°–340° C. in an atmosphere of hydrogen.

7. Process according to claim 3 in which potassium hydride is produced in situ by heating metallic potassium at 160° to 270° C. in an atmosphere of hydrogen.

8. Process according to claim 4 in which lithium hydride is produced in situ by heating metallic lithium at 200°–260° C. in an atmosphere of hydrogen.

References Cited

UNITED STATES PATENTS 2,741,539    4/1956    Banus et al. _____ 23—362
3,077,376    2/1963    Shubert et al. _____ 23—361

OSCAR R. VERTIZ, Primary Examiner

G. O. PETERS, Assistant Examiner